May 15, 1951 H. O. PETERSON 2,553,271

DIVERSITY RECEIVER

Filed Dec. 11, 1945 3 Sheets-Sheet 1

INVENTOR
Harold O. Peterson
BY H. S. Grover
ATTORNEY

DIVERSITY RECEIVER

Filed Dec. 11, 1945

DIVERSITY RECEIVER

Filed Dec. 11, 1945

INVENTOR
Harold O. Peterson
BY H. S. Grover
ATTORNEY

Patented May 15, 1951

2,553,271

UNITED STATES PATENT OFFICE 2,553,271

DIVERSITY RECEIVER

Harold O. Peterson, Riverhead, N. Y., assignor to Radio Corporation of America, a corporation of Delaware Application December 11, 1945, Serial No. 634,350

4 Claims. (Cl. 250—8)

Figure 1:
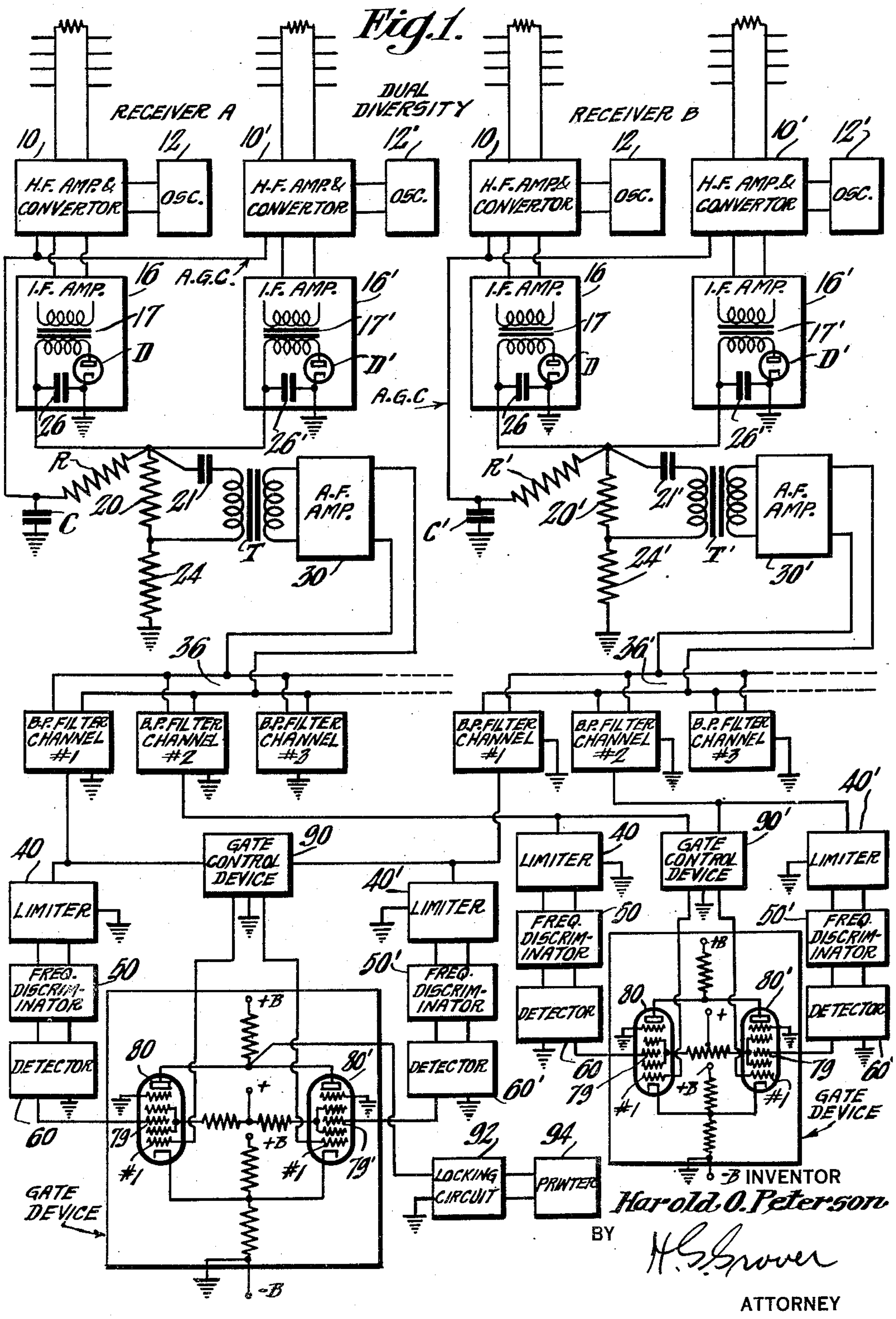

This application concerns receivers for telegraphy signals or similar signals of low frequency or relatively slowly varying type including facsimile signals and the like. This application in particular concerns diversity receivers in frequency shift telegraphy signalling systems.

In frequency shift telegraphy, at the transmitter wave energy is shifted in accordance with signals from a first frequency representing mark to a second frequency representing space and vice versa. The first and second frequencies are separated in the frequency spectrum the desired amount depending on the use to which the system is to be put, and at least an amount sufficient to permit the receiver circuits to discriminate between the mark and space frequencies, and provide control currents for recording purposes. The energies representing mark and space may be of high frequency or of intermediate frequency used to modulate high frequency oscillations or of low frequency, in which case they are used to modulate higher frequency oscillations. These systems are treated in some respects at least as frequency modulation systems since currents are shifted in frequency by the signals. The marking and spacing frequencies are on continuously but are never on simultaneously during signalling.

The general object of my invention as disclosed herein is to improve frequency shift telegraphy receivers. Another object of my invention as disclosed herein is to improve frequency shift telegraphy receivers of the diversity type.

At the present time radio telegraphy signals are in some instances transmitted over radio telephone channels. The radio telephone channels are of about 6000 cycles width and the on-off telegraph channels each require a band of frequencies about 2500 cycles wide, and under the best conditions only two on-off telegraphy channels can be set up over one radio telephone channel. In practice, one radio telephone channel is generally used to carry one on-off telegraphy channel.

It is of obvious importance to make the best use of transmitting space. To this end it has been found desirable to transmit radio printer channels by frequency shift modulation of a tone transmitted over a radio telephone circuit. The radio telephone circuit may operate on either single side band or double side band modulation methods. For double side band it may be either phase or amplitude modulation. In the present application it is assumed that the frequency shifted tone is used to amplitude modulate a carrier and the carrier and both side bands transmitted. At the receiver the frequency shift modulated tone is recovered and demodulated, thus making available the benefits inherent in frequency modulation.

In furtherance of the desire to put to the greatest use possible the available radio telephone channels several tone frequencies can be transmitted simultaneously, thus giving a number of different channels. In some cases several printer circuits can be transmitted on each of the tone channels by time division multiplex methods, thus making it possible to transmit many printer circuits through one radio telephone channel. It will be assumed that at the transmitter a high frequency carrier is modulated by a plurality of tones, say 4, and the carrier and both side bands transmitted. The tones might be, for example, 1050 cycles $\pm\Delta F$, $1650\pm\Delta F$, $2250\pm\Delta F$, etc. where $\Delta F$ represents the keyed frequency deviation on both sides of the tone, say, for example, 100 cycles. This permits use of several frequency shifted tones on each telephone channel. Now if four channel time division multiplex is applied, four printer signals can be transmitted on each of the several frequency shifted tone channels.

An object of the present invention is improved reception and demodulation of frequency modulation signals transmitted as outlined above.

In accordance with my invention, I make use of a dual diversity receiver system wherein the modulated carriers are demodulated and the tone frequencies of the various channels recovered. The space diversity receivers of which there are two may be dual in part at least with antennas having different signal interception characteristics for wave angle diversity. There are two channels for each tone. In each channel the tone before or after demodulation is fed to a gating tube which is controlled by the strength of the current in the said channel so that the best signal output is supplied from the gating tube to recording apparatus. This feature of my invention is likewise applicable to single channel diversity system.

It is common knowledge that signals during propagation are subjected to random fading due to multipath transmission and that this results in output distortion. In particular is this true of frequency shift diversity systems wherein the detector output represents extent of frequency shift, and signal selection from one of several receivers is made before detection because then the signals in the several channels may be out of phase and when the switching takes place the change in phase of current to the discriminator and detector is treated like signal modulation and causes distortion in the detector output.

A primary object of my invention is to eliminate or at least reduce to a large extent this type of distortion in frequency modulation systems.

In one embodiment of my invention such distortion is reduced by using a discriminator and detector in each channel and carrying out the channel selection or switching in low frequency or keying frequency stages.

However, in many cases it may be preferred to have a single discriminator and detector for each pair of tone channels. In this case then the switching takes place at tone or higher frequency and detection of the phase differences in the currents in the switched channels causes distortion in the detector output. Another object of my invention is to reduce this distortion resulting from phase differences between the frequency shifted currents in the switched channels.

In this second and preferred embodiment switching takes place before detection, but means is provided to reduce the distortion described above. Then the gating stages operate at tone or higher frequency. The currents in the two channels are supplied by different receivers and may be out of phase when diversity switching from one tone channel to the other takes place, and detection of the phase displaced currents results in distortion. In this embodiment an improved arrangement is provided for reducing or substantially eliminating the effect of relative phase displacement in the modulated tone currents. This is accomplished by multiplying the frequency of the modulated tone currents before the same are applied to the gating stages wherein output is switched from one receiver to the other. The out-of-phase relation described above causing the distortion cannot exceed 180°. By multiplying the frequency shifted tone the amount of phase displacement is made of a relatively insignificant amount as compared to the total frequency shift so that when there is a phase displacement and switching takes place, little or no distortion results in the detector output.

My invention is obviously applicable to single side band receivers. The means for reducing distortion is applicable to single channel frequeny shift receivers such as disclosed in Schock et al. U. S. application Serial #632,978, filed Dec. 5, 1945, now Patent #2,515,668, dated July 18, 1950.

The manner in which the above objects and others are attained and advantages derived by attaining the same will now be described in detail. In this description reference will be made to the attached drawings wherein Figs. 1 and 2 each show a different embodiment of a dual diversity receiving system for frequency shift telegraphy arranged in accordance with my invention. Figs. 3, 4 and 5 are used to explain the operation of my system.

Referring now to Fig. 1 of the drawings, my diversity receiving system comprises at least one pair of diversity receivers A and B. The diversity receivers A and B may be of the dual diversity type comprising two separate receivers. The antennas of the receivers may have different propagation interception characteristics. Each receiver may include a high frequency amplifier 10 feeding an intermediate frequency amplifier 16. The high frequency amplifiers may be of the heterodyne type having an oscillator 12 and including converters therein not shown. The oscillators 12 may be separate or may represent an oscillator common to all of the receivers. The intermediate frequency amplifier includes if desired a second source of oscillations and intermediate frequency converter and an I. F. amplifier and detector D. The detector D has as an output load resistances 20 and 24 connecting one terminal of the input transformer 17 to ground. The cathode of the diode is grounded, thereby completing the direct current circuit. The alternating current circuit is completed by a condenser 26. The size of the condenser 26 depends on the frequency supplied to the I. F. transformer connected to the detector diode D. The receivers A and B are similar and corresponding parts therein have been labeled with the same number or symbol in order to simplify and shorten the description.

The potential drop across the resistances 20 and 24 represents the signal output which in the embodiment described will be assumed to be direct current of varying magnitude modulated by the transmitted tone frequencies.

The direct current potential across resistors 20 and 24 varies in accordance with the strength or magnitude of the I. F. current supplied to the detectors D and D′. This current in turn is of a magnitude representative of the strength of the signal picked up by the amplifiers 10 and 10′. This direct current potential is supplied by a resistance R across a condenser C and is then fed back to the control grid of an amplifier or control grids of amplifier stages in the high frequency amplifiers 10 and 10′. The time constant of C and R is adjusted so that the automatic gain control takes care of slow variations in the combined strength of the received signals but does not respond to signal frequency variations thereof. The automatic volume control circuits and the receivers as described hereinbefore may be per se conventional except in the combination, and a detailed description of the features of circuits thereof except as given above does not appear necessary.

The potential of varying magnitude representative of the signals is impressed from across resistor 20 by condenser 21 to the primary winding of a transformer T, and from the secondary winding of this transformer to an audio frequency amplifier 30, and from said amplifier to lines 36. Where single channel transmission is used the output of 30 may be represented by a single tone. The same remarks apply to the output of audio frequency amplifier 30′. In the embodiment illustrated however, the output of the audio amplifier 30 comprises a plurality of tones, while the output of the audio frequency amplifier 30′ also comprises a corresponding series of tones depending on the number of tone channels put on the carrier at the transmitter. In the embodiment illustrated it is assumed that there are at least two frequency shifted tones, three being shown. The frequency shifted tones on the lines 36 and 36′ are fed to a series of channels designated channel #1, channel #2 and channel #3. In these units are included amplifiers if desired, but in any case band pass filters each of which selects one of the frequency shifted tones and excludes all other tones. The selected tones are fed through one channel at the output of say receiver A through a current amplitude limiter 40, a frequency discriminator 50, and a detector 60. The current amplitude limiter 40, the frequency discriminator 50, and the detector 60, may be of any approved type, there being many approved limiters, discriminators and detectors known in the art. Preferably the limiter, discriminator and detector here is as illustrated in U. S. application Serial #632,978, filed December 5, 1945.

The frequency shifted tones at the output of amplifier 30′ of the other dual diversity receiver B are supplied by lines 36′ to the several channels. The #1 channel is similar to the #1 channel described hereinbefore and includes a band pass filter adjusted to pass the same frequency shifted tone passed by the channel #1 connected to the output of the receiver A. This frequency shifted tone as selected is supplied to a limiter 40′, a frequency discriminator 50′, and a frequency shift detector 60′. This limiter, discriminator and detector may be similar to the ones described hereinbefore.

The output of the detectors 60 and 60′ are direct currents which vary in magnitude between two values, one of which represents marking condition at the transmitter and the other of which represents spacing condition at the transmitter. The system is adjusted so that these potentials both vary between substantially equal values. The direct current potentials of varying magnitude are applied to the grids 79 and 79′ of a pair of gating tubes 80 and 80′ which correspond to the gating tubes similarly numbered in the said application. The gating tubes 80 and 80′ have the purpose of selecting output from that receiver getting the best signal. The gating tubes 80 and 80′ have their #1 grids connected to a gate control device 90 wherein are derived potentials which vary differentially, one being up and the other down, depending on which receiver is getting the best signal. This gate control device may comprise a double locking circuit and may be in all respects in accordance with the gating control device in the aforementioned application. Output from channel #1 of receiver A and channel #1 of receiver B is supplied to a differential detector in unit 90 wherein the magnitudes of the outputs are compared and a direct current potential is produced which varies in one direction when the signal at receiver B is the best, and another direction when the signal at the receiver A is best. This signal strength comparing means may correspond fully with the said means as described in the aforementioned application. The control potential operates through a control tube (in 90) to trigger a double locking circuit (in 90) to increase (make less negative) the potential on the #1 grid of one or the other of the gate tubes 80 and 80′, and decrease (make less positive) the potential on the #1 grid of the other of the gate tubes so that if receiver A gets the best signal tube 80 is opened up and 80′ is closed, keeping in mind that the control potentials from 90 are differential. If receiver B gets the best signal tube 80′ is opened up and tube 80 is closed. Another way to consider the operation of the gate device is to note that the tubes 80 and 80′ are biased to cutoff and one or the other thereof turned on by the control potential from 90.

The detected output from detectors 60 or 60′, whichever is selected by the gating devices, is supplied to recording apparatus or other utilizing means as desired. In the embodiment disclosed this output is used to trigger the locking circuit 92 which may be a double locking circuit as disclosed in the above mentioned application. This locking circuit may include the locking circuit restoring feature of Atwood et al. U. S. application Serial #618,760, filed September 26, 1945, now Patent #2,511,093, dated June 13, 1950. The locking circuit is shown as operating a printer 94 directly. As an alternative the locking circuit may be caused to operate a tone keyer which transmits a tone over a land line circuit to the central office where the tone is caused to operate the printer through suitable converting circuits. The tone keyer may be either of the frequency shift or the on-off keying type. When the frequency shift type is used the potentials of varying magnitude at the locking circuit 92 output are used for modulating a tone say, for example, for controlling a reactance tube modulator associated with a tone frequency current generator. When the tone keyer is of the on-off type it may be substantially as illustrated in Peterson abandoned U. S. application Serial #630,428, filed November 23, 1945. Since detection takes place in the tone channels prior to the gate switching between channels, the distortion described hereinbefore which would result from phase displacement of the currents switched, shown in Figs. 3 and 4, is substantially completely eliminated.

Current representing another tone channel may be selected by the band pass filters in the channel #2 connected with the output of receiver A and the corresponding channel #2 connected with the output of receiver B, and these two tones are supplied through limiters 40 and 40′, discriminators 50 and 50′ and detectors 60 and 60′ to other gating tubes 80 and 80′ which are again controlled by a potential derived by comparing, in 90′, the magnitudes of the tones selected in channels #2. The anodes of tubes 80 and 80′ then supply channel #2 output by connections not shown to other recording apparatus such as the locking circuit 92 and printer 94 for the #1 channel. This apparatus is similar to that described hereinbefore and the parts thereof such as are shown bear reference numerals corresponding to those applied to the parts described hereinbefore. Additional tone channels #3 etc. have additional circuit connections as described hereinbefore.

Figure 2:
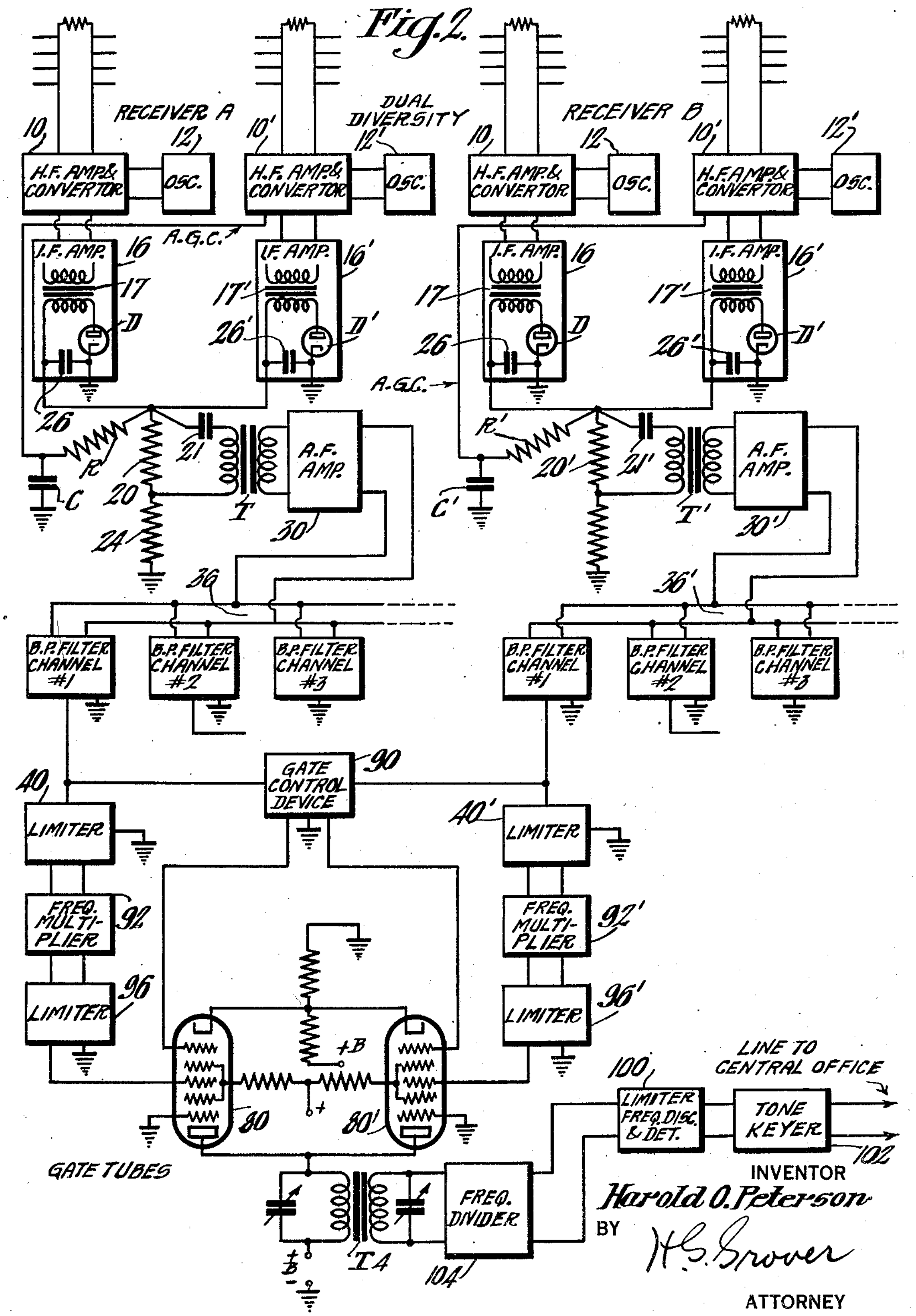
Figures 3, 4, 5:
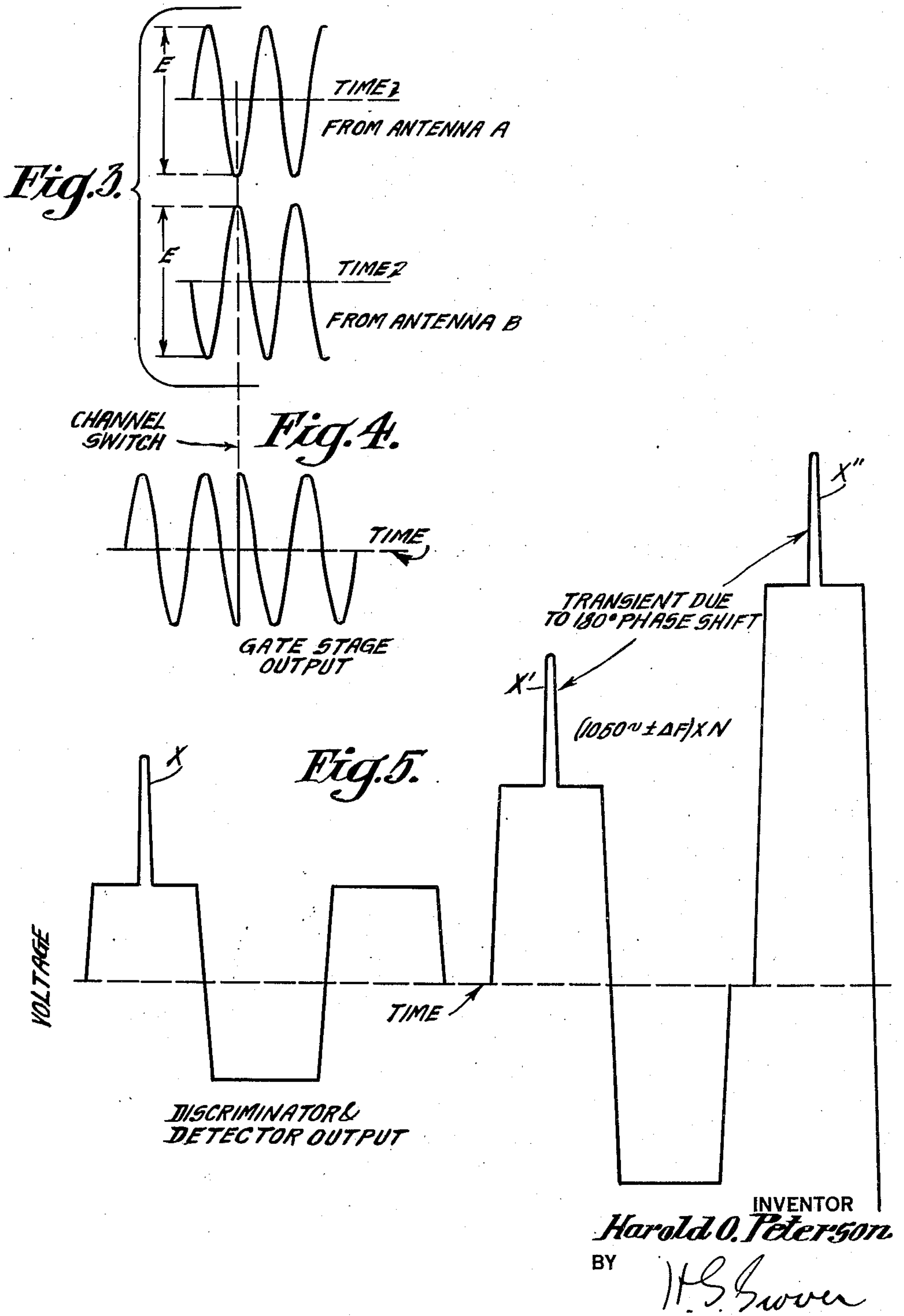

An improved and preferred method of and means for receiving a plurality of frequency shifted single channel tones or multichannel tones is illustrated in Fig. 2. This embodiment is a modification of the embodiment of Fig. 1 and is similar thereto except as described hereinafter. The receivers may be as illustrated in Fig. 1. The outputs of the audio frequency amplifiers 30 and 30′ are again as in Fig. 1. The same remarks apply to channels #1, #2, #3, etc., and the band pass filters therein. In this embodiment, however, the gating takes place at I. F. or tone frequency, in any case prior to demodulation of the frequency shifted tone. Then each channel comprises a limiter 40 as before. In this embodiment, however, each channel includes as a part thereof a frequency multiplier 92 followed by a current limiter 96. The limiters 96 and 96′ feed the frequency multiplied and amplified frequency shifted tones to the gating tubes 80 and 80′. The anodes of the gating tubes now include a tuned circuit having an inductance which forms a primary winding of a transformer T4, the secondary winding of which is coupled to a limiter, frequency discriminator and detector 100. The tuned circuits of the transformer T4 may be parallel tuned to the frequency of the frequency shifted intermediate frequency energy or tone passed by one of the gating tubes from the channel including frequency multiplier 92 or the channel including the frequency multiplier 92'. The current limiter, discriminator and detector 100 may correspond fully to the current limiter, discriminator and detector shown in one of the channels of the frequency shift receiver disclosed in Schock et al. U. S. application Serial #632,978, filed Dec. 5, 1945. The output of the discriminator, limiter and detector 100 may operate a printer directly through locking circuits as in Fig. 1, or a tone keyer either substantially directly or through a double locking circuit as disclosed in said last mentioned application. Direct operation of the tone keyer 102 is shown. The gating tubes 80 and 80' are turned on and off as in Fig. 1 by differentially changing potentials developed in a gate control device 90, as described in detail hereinbefore.

The frequency deviation, which is in accordance with the signals, is multiplied by frequency multipliers 92 and 92'. For example, if the currents out of the limiters 40 and 40' have a frequency F1 equal to 1050 cycles$\pm\Delta F$, after multiplication the current out of frequency multipliers 92 and 92' will have the same frequency multiplied by N, the multiplication factor of the multipliers. The deviation due to the signal is also multiplied by N. The maximum transient deviation due to the switching action is not increased however, because the instantaneous phase difference between the two branches cannot exceed 180° at the instant of switching. Therefore, I multiply the frequency of each branch by sufficient order of multiplication to cause the switching transients to become relatively small as compared to the signal and consequently the switching transients have little or no effect in the detector outputs. This is illustrated graphically in Figs. 3, 4 and 5. The signalling currents out of receivers A and B may be out-of-phase when the gating action is taking place, as illustrated in Fig. 3. Then the currents supplied out of the gating tubes would be as illustrated in Fig. 4. Note that when the grating action takes place there might be a phase displacement of the currents out of the gating tubes. Note also that this phase displacement cannot exceed 180°. If the currents out of the gating tubes, as illustrated in Fig. 4 were subjected to discrimination and detection as has been done heretofore, the amount of distortion superimposed on the currents derived by demodulation of the frequency deviations in accordance with signals would be relatively large as indicated at X in Fig. 5. This would result in improper operation of the signal recording apparatus. By multiplying the frequency of the currents supplied by receivers A and B before the gating action takes place, the deviations at signal frequency thereof are increased an amount depending upon the multiplication factor. The frequency deviation occasioned by the out-of-phase relation however, is not correspondingly increased by the multiplication. When multiplied these currents then are subjected to discrimination and detection at the output of the gating tubes. After multiplication the current variations due to distortion superimposed on the signal are small as compared to the signal currents. This has been illustrated at X' and X'' in Fig. 5.

The output of the gating tubes after limiting is subjected to a frequency discriminating and detecting action in the unit 100 and operates a tone keyer 102 which sends keyed tone either frequency shift or on-off to the central office, where the same is caused to operate radio printers or other transcribing devices. If desired, the output of the gating tubes may be supplied to a frequency divider to bring the frequency back down to suitable value for transmission to the central office. Then a frequency divider 104 may be included between the output of transformer T4 and the input of the unit 100.

The frequency multipliers may be conventional and may comprise cascaded tube multipliers such as, for example, a series of frequency doublers. The apparatus therein would include frequency selective circuits tuned to select the desired harmonic frequency in a known manner.

What is claimed is:

1. In signalling apparatus, in combination, means including dual diversity receivers for producing at their outputs two currents the frequencies of which shift in accordance with signals, which currents are subjected to diversity effects, paths for said currents including a valve for each receiver with means for impressing the currents on said paths, a frequency discriminating and detecting means coupled to the outputs of both valves, means located between the dual receiver outputs and said discriminating and detecting means for comparing the relative strengths of the two currents and for deriving a potential the polarity of which depends on which current is stronger, means for differentially controlling the conductivities of said valves in accordance with said potential to make one or the other thereof conductive, depending on which current is stronger, and a frequency multipler in each of said paths between each valve and its corresponding receiver output for reducing distortion resulting from out-of-phase relation of said currents when said valves are differentially controlled.

2. In signalling apparatus, in combination, means for deriving two currents the frequencies of which shift in accordance with signals, which currents are subjected to relative phase displacement due to diversity effects, paths for said currents comprising in cascade a current amplitude limiter and a valve, a common output circuit for said paths, means for comparing the relative strengths of the two currents and for deriving a potential the polarity of which depends on which current is stronger, means for differentially controlling the conductivities of said values in accordance with said potential to open one or the other thereof depending on which current is of greater magnitude, a frequency multiplier in each of said paths between each valve and its corresponding deriving means for reducing distortion resulting from out-of-phase relation of said currents when said valves are operated to shift the common output from one current path to the other current path, and a discriminator and detector coupled to said common output circuit.

3. In a signalling system for carrier current modulated by a plurality of tones each modulated in frequency in accordance with a separate message, in combination, two pairs of diversity receivers for said modulated carrier current, each receiver including a demodulator for recovering all of the modulated tones, each pair of receivers including a common automatic gain control circuit, a common output circuit for each pair of receivers wherein currents corresponding to each of said tones appear, a plurality of selecting circuits, there being a selecting circuit for each tone, coupled to each of said common output circuits, a plurality of pairs of gating valves each having an input electrode, a control electrode and an output electrode, there being a pair of gating valves for each tone, separate couplings between those selecting circuits, coupled to the two common output circuits and which pass like tones, and the input electrodes of the pair of gating valves for the said tone, means for comparing the relative magnitudes of the like tones from the two output circuits and for producing a potential the polarity of which depends on which tone is of greater magnitude, a differential coupling between said means and the control electrodes of the gating valves of the pair of valves for the respective selecting circuits, and a signal utilizing apparatus coupled to the output electrodes of each pair of gating valves.

4. In a signalling system for carrier current modulated by a plurality of tones each modulated in frequency in accordance with a separate message, in combination, two receivers for said modulated carrier current, a demodulator in each receiver for recovering all of the modulated tones, an output circuit for each receiver in which output circuit currents corresponding to each of said modulated tones appear, a plurality of paths, there being a path for each modulated tone, coupled to each of said output circuits, a gating or switching valve in each path, the gating or switching valves being arranged in pairs there being a pair for each modulated tone, a separate common output load coupled to the outputs of the two paths for each of said tones, means for comparing the relative magnitudes of corresponding tones from said two output circuits and for producing a potential the polarity of which depends on which tone is of greater magnitude, means for controlling said gating valves differentially by said potential to supply output, from said output circuit wherein the modulated tone is stronger, to the corresponding common output load, and means in said paths for reducing distrotion resulting from out-of-phase relation of said currents when switching by said valves takes place.

HAROLD O. PETERSON.

REFERENCES CITED

The following references are of record in the file of this patent:

UNITED STATES PATENTS

| Number | Name | Date |
|---|---|---|
| 1,534,719 | Kellogg | Apr. 21, 1925 |
| 1,888,065 | Beverage | Nov. 15, 1932 |
| 1,922,282 | Bellescize | Aug. 15, 1933 |
| 1,950,123 | Ohl | Mar. 6, 1934 |
| 2,210,089 | Loughren | Aug. 6, 1940 |
| 2,249,425 | Hansell | July 15, 1941 |
| 2,253,832 | Whitaker | Aug. 26, 1941 |
| 2,253,867 | Peterson | Aug. 26, 1941 |
| 2,282,526 | Moore | May 12, 1942 |
| 2,293,565 | Schock | Aug. 18, 1942 |
| 2,306,687 | Cox | Dec. 29, 1942 |
| 2,333,335 | Peterson | Nov. 2, 1943 |
| 2,364,952 | Crosby | Dec. 12, 1944 |
| 2,375,126 | Mathes | May 1, 1945 |
| 2,383,126 | Hollingsworth | Aug. 21, 1945 |
| 2,384,456 | Davey | Sept. 11, 1945 |
| 2,414,111 | Lyons | Jan. 14, 1947 |
| 2,447,057 | Crosby | Aug. 17, 1948 |
| 2,484,824 | Hansel | Oct. 18, 1949 |
| 2,494,309 | Peterson et al. | Jan. 10, 1950 |

OTHER REFERENCES

Electronics, July 1945, pages 110–113, "Dual-Triode Trigger Circuits" by Byron E. Phelps.